US009255505B2

(12) United States Patent
Nakayama et al.

(10) Patent No.: US 9,255,505 B2
(45) Date of Patent: Feb. 9, 2016

(54) EXHAUST PURIFICATION DEVICE FOR INTERNAL COMBUSTION ENGINE

(75) Inventors: Shigeki Nakayama, Gotenba (JP); Hiromasa Nishioka, Susono (JP); Daichi Imai, Sunto-gun (JP); Hiroshi Otsuki, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/413,777

(22) PCT Filed: Jul. 12, 2012

(86) PCT No.: PCT/JP2012/067848
§ 371 (c)(1),
(2), (4) Date: Jan. 9, 2015

(87) PCT Pub. No.: WO2014/010064
PCT Pub. Date: Jan. 16, 2014

(65) Prior Publication Data
US 2015/0167518 A1  Jun. 18, 2015

(51) Int. Cl.
*F01N 3/022* (2006.01)
*F01N 3/035* (2006.01)
(Continued)

(52) U.S. Cl.
CPC .............. *F01N 3/035* (2013.01); *B01D 53/944* (2013.01); *F01N 3/0253* (2013.01); *F01N 9/002* (2013.01);
(Continued)

(58) Field of Classification Search
CPC ... F01N 3/0222; F01N 3/0232; F01N 3/0253; F01N 3/035; F01N 9/002; F01N 11/002; F01N 2250/02; F01N 2510/0682; F01N 2550/04; F01N 2560/05; F01N 2560/08; F01N 2610/03; F01N 2900/0412; F01N 2900/0418; F01N 2900/1402; F01N 2900/1406; F01N 2900/1606

USPC .......... 60/276, 277, 286, 295, 297, 300, 303, 60/311, 320
See application file for complete search history.

(56) References Cited

U.S. PATENT DOCUMENTS

| 4,538,411 A | 9/1985 | Wade et al. |
| 2003/0131592 A1* | 7/2003 | Saito ...................... F01N 9/002 60/295 |

(Continued)

FOREIGN PATENT DOCUMENTS

| EP | 2339135 A1 | 6/2011 |
| JP | 2000-018019 A | 1/2000 |

(Continued)

*Primary Examiner* — Thomas Denion
*Assistant Examiner* — Jorge Leon, Jr.
(74) *Attorney, Agent, or Firm* — Kenyon & Kenyon LLP

(57) ABSTRACT

A particulate filter arranged in an engine exhaust passage is provided with alternately arranged exhaust gas inflow and outflow passages and porous partition walls which separate these passages from each other. In each partition wall, a coated zone where a coated layer with an average pore size smaller than that of a partition wall substrate is used to cover the substrate surface and a non-coated zone downstream of the coated zone where the substrate surface is not covered by said coated layer, are defined, and the ash in the exhaust gas can pass through the partition wall in the non-coated zone. Judgment processing which judges if a particulate matter trapping rate of the particulate filter has fallen below an allowable lower limit value is performed. PM removal processing is performed when it is judged that the particulate matter trapping rate has fallen below the allowable lower limit value.

8 Claims, 13 Drawing Sheets

(51) Int. Cl.
*F01N 11/00* (2006.01)
*F02D 41/02* (2006.01)
*F01N 9/00* (2006.01)
*F01N 3/025* (2006.01)
*F02D 41/00* (2006.01)
*B01D 53/94* (2006.01)
*F01N 3/023* (2006.01)

(52) U.S. Cl.
CPC .............. *F01N 11/00* (2013.01); *F01N 11/002* (2013.01); *F02D 41/0055* (2013.01); *F02D 41/029* (2013.01); *B01D 2255/9155* (2013.01); *B01D 2255/9205* (2013.01); *F01N 3/0222* (2013.01); *F01N 3/0232* (2013.01); *F01N 2240/38* (2013.01); *F01N 2250/02* (2013.01); *F01N 2510/0682* (2013.01); *F01N 2550/04* (2013.01); *F01N 2560/05* (2013.01); *F01N 2560/08* (2013.01); *F01N 2610/03* (2013.01); *F01N 2900/0412* (2013.01); *F01N 2900/0418* (2013.01); *F01N 2900/1402* (2013.01); *F01N 2900/1406* (2013.01); *F01N 2900/1606* (2013.01); *F02D 2200/0812* (2013.01); *Y02T 10/47* (2013.01)

(56) References Cited

U.S. PATENT DOCUMENTS

| | | | |
|---|---|---|---|
| 2005/0050870 A1* | 3/2005 | Cheng | B01D 46/2459 55/523 |
| 2005/0056006 A1* | 3/2005 | Huang | B01D 46/2418 60/297 |
| 2006/0059901 A1* | 3/2006 | Saito | F01N 3/023 60/297 |
| 2010/0018190 A1* | 1/2010 | Harada | B01D 53/944 60/295 |
| 2011/0107746 A1* | 5/2011 | Matsumoto | B01D 53/945 60/297 |
| 2011/0252773 A1 | 10/2011 | Arnold et al. | |
| 2013/0269323 A1* | 10/2013 | Oguri | B01D 46/0063 60/276 |

FOREIGN PATENT DOCUMENTS

| | | |
|---|---|---|
| JP | 2003-166412 A | 6/2003 |
| JP | 2004-124723 A | 4/2004 |
| WO | 2010/112781 A1 | 10/2010 |

* cited by examiner

EXHAUST PURIFICATION DEVICE FOR INTERNAL COMBUSTION ENGINE

CROSS-REFERENCE TO RELATED APPLICATION

This is a national phase application based on the PCT International Patent Application No. PCT/JP2012/067848 filed Jul. 12, 2012, the entire contents of which are incorporated herein by reference.

TECHNICAL FIELD

The present invention relates to an exhaust purification device for an internal combustion engine.

BACKGROUND ART

Known in the art is a compression ignition type internal combustion engine which arranges a particulate filter for trapping particulate matter in exhaust gas at the inside of an exhaust passage. As a result, the quantity of particulate matter which is discharged into the atmosphere is suppressed.

In this regard, if the quantity of particulate matter on the particulate filter becomes greater, the pressure loss of the particulate filter will gradually become greater. As a result, the engine output is liable to drop.

Therefore, known in the art is an internal combustion engine which maintains the particulate filter in an oxidizing atmosphere while making the temperature of the particulate filter rise so as to make the particulate matter burn off from the particulate filter as PM removal processing (see PLT 1). In this internal combustion engine, the pressure difference between the upstream and downstream sides of the particulate filter 24 is detected and when the pressure difference becomes a predetermined upper limit value or more, the PM removal processing is performed.

CITATIONS LIST

Patent Literature

PLT 1: Japanese Patent Publication No. 2000-018019A

SUMMARY OF INVENTION

Technical Problem

In this regard, exhaust gas contains nonburnable ingredients called "ash". This ash is trapped together with the particulate matter at the particulate filter. In this regard, even if PM removal processing is performed, the ash will not burn or vaporize, but will remain on the particulate filter. For this reason, as the engine operating time becomes longer, the quantity of ash on the particulate filter will gradually increase and the pressure loss of the particulate filter will gradually become larger. As a result, even if the PM removal processing is repeatedly performed, the engine output is liable to drop.

In the above-mentioned PLT 1, this problem is not considered at all much less is a solution disclosed.

Solution to Problem

According to a first aspect of the present invention, there is provided an exhaust purification device for an internal combustion engine which is provided with a particulate filter which is arranged inside of an engine exhaust passage for trapping particulate matter which is contained in exhaust gas, which particulate filter is provided with alternately arranged exhaust gas inflow passages and exhaust gas outflow passages and porous partition walls which separate these exhaust gas inflow passages and exhaust gas outflow passages from each other, wherein in each partition wall, a coated zone where a coated layer with an average pore size which is smaller than the average pore size of a partition wall substrate is used to cover the substrate surface and a non-coated zone at the downstream side of the coated zone and where the substrate surface is not covered by the coated layer, are defined and wherein the pore size of each partition wall is set so that the ash which is contained in the exhaust gas can pass through the partition wall in the non-coated zone, a judging means for performing judgment processing which judges if a particulate matter trapping rate of the particulate filter has fallen below an allowable lower limit value, and a PM removing means for performing PM removal processing which removes particulate matter from the particulate filter when it is judged that the particulate matter trapping rate of the particulate filter has fallen below the allowable lower limit value.

According to a second aspect of the present invention, there is provided an exhaust purification device for an internal combustion engine which is provided with a particulate filter which is arranged inside of an engine exhaust passage for trapping particulate matter which is contained in exhaust gas, in which particulate filter, a particulate matter trapping rate of the particulate filter is maintained substantially constant regardless of an increase of a pressure loss of the particulate filter or increases along with the increase of the pressure loss of the particulate filter when the pressure loss of the particulate filter is small and, when the pressure loss of the particulate filter further increases, falls along with the increase of the pressure loss of the particulate filter, a judging means for performing judgment processing which judges if a particulate matter trapping rate of the particulate filter has fallen below an allowable lower limit value, and a PM removing means for performing PM removal processing which removes particulate matter from the particulate filter when it is judged that the particulate matter trapping rate of the particulate filter has fallen below the allowable lower limit value.

According to a third aspect of the present invention, there is provided an exhaust purification device for an internal combustion engine which is provided with a particulate filter which is arranged inside of an engine exhaust passage for trapping particulate matter which is contained in exhaust gas, in which particulate filter, a change rate of pressure loss of the particulate filter with respect to a particulate matter trapped quantity on the particulate filter is maintained substantially constant regardless of an increase of a particulate filter trapped quantity or increases along with the increase of the particulate matter trapped quantity when the particulate matter trapped quantity is small and, when the particulate matter trapped quantity further increases, decreases and then increases through a local minimum value along with the increase of the particulate matter trapped quantity, a judging means for performing judgment processing which judges if a particulate matter trapping rate of the particulate filter has fallen below an allowable lower limit value, and a PM removing means for performing PM removal processing which removes particulate matter from the particulate filter when it is judged that the particulate matter trapping rate of the particulate filter has fallen below the allowable lower limit value.

Preferably, the judging means detects the pressure loss of the particulate filter and judges that the particulate matter trapping rate has fallen below the allowable lower limit value when the detected pressure loss increases over the allowable upper limit value.

Preferably, the judging means finds the change rate of the pressure loss of the particulate filter with respect to the particulate matter trapped quantity on the particulate filter, judges if a local minimum value has occurred in that change rate of the pressure loss, and, when judging that a local minimum value has occurred in that change rate of the pressure loss, judges that the particulate matter trapping rate has fallen below the allowable lower limit value.

Preferably, the judging means finds the quantity of particulate matter which flows into the particulate filter, finds the quantity of particulate matter which flows out from the particulate filter, uses these found quantities of particulate matter as the basis to find the particulate matter trapping rate of the particulate filter, and judges if the found particulate matter trapping rate has fallen below the allowable lower limit value.

Advantageous Effects of Invention

It is possible to reliably trap particulate matter while suppressing an increase of the pressure loss of the particulate filter due to ash.

DESCRIPTION OF EMBODIMENTS

Figure 1:
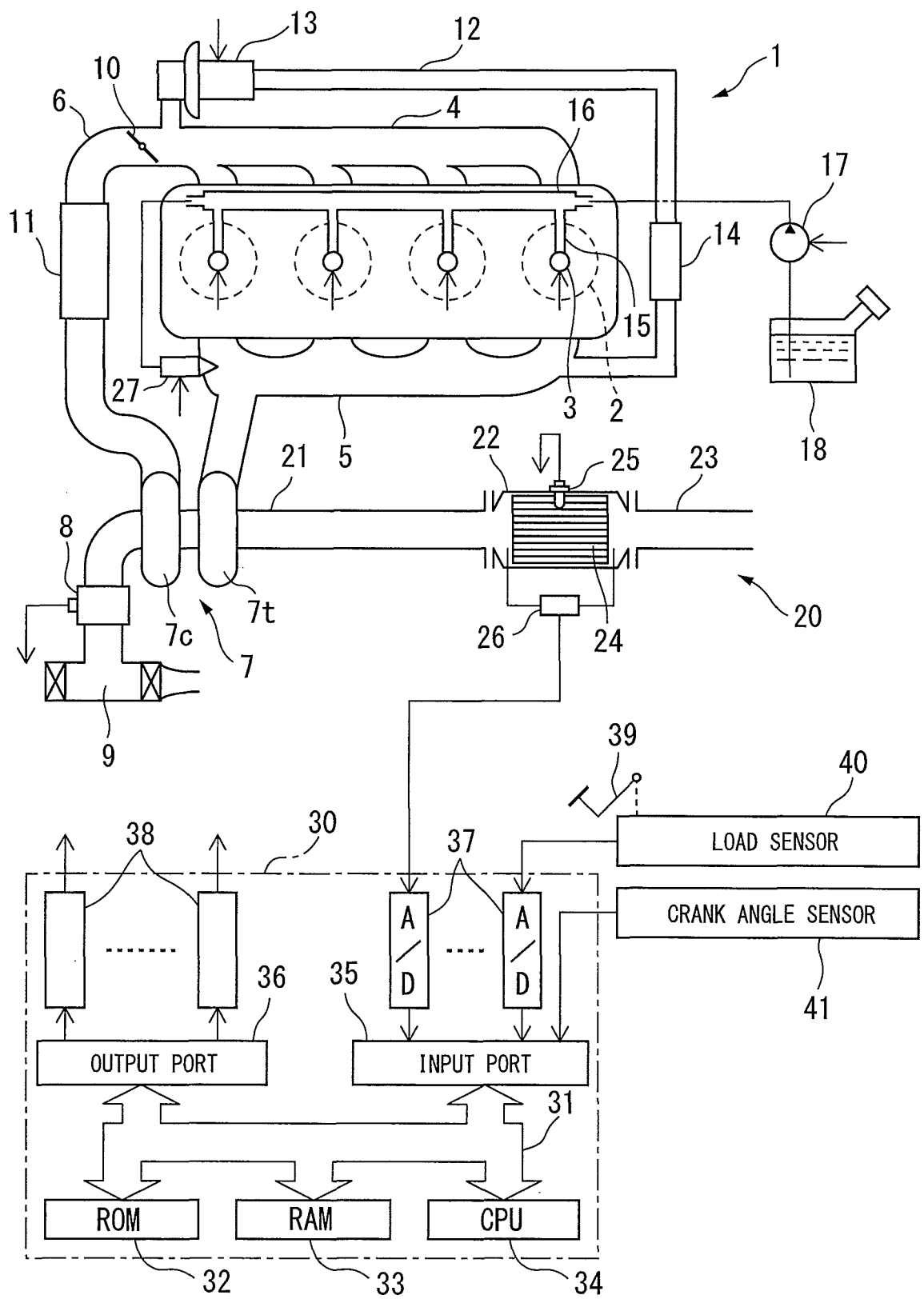
FIG. 1 is an overview of an internal combustion engine of an embodiment according to the present invention.

Referring to FIG. 1, 1 indicates a body of a compression ignition type internal combustion engine, 2 a combustion chamber of each cylinder, 3 an electronic control type fuel injector for injecting fuel into each combustion chamber 2, 4 an intake manifold, and 5 an exhaust manifold. The intake manifold 4 is connected through an intake duct 6 to an outlet of a compressor 7c of an exhaust turbocharger 7, while the inlet of the compressor 7c is connected through an air flowmeter 8 to an air cleaner 9. Inside the intake duct 6, an electrical control type throttle valve 10 is arranged. Furthermore, around the intake duct 6, a cooling device 11 is arranged for cooling the intake air which flows through the intake duct 6. On the other hand, the exhaust manifold 5 is connected to an inlet of the exhaust turbine 7t of the exhaust turbocharger 7, while an outlet of the exhaust turbine 7t is connected to an exhaust post treatment device 20.

The exhaust manifold 5 and the intake manifold 4 are connected with each other through an exhaust gas recirculation (hereinafter referred to as "EGR") passage 12. Inside the EGR passage 12, an electrical control type EGR control valve 13 is arranged. Further, around the EGR passage 12, a cooling device 14 is arranged for cooling the EGR gas which flows through the inside of the EGR passage 12. On the other hand, each fuel injector 3 is connected through a fuel runner 15 to a common rail 16. This common rail 16 is supplied with fuel from an electronically controlled type of variable discharge fuel pump 17. The fuel which is supplied into the common rail 16 is fed through fuel runners 15 to the fuel injectors 3. In the embodiment which is shown in FIG. 1, this fuel is comprised of diesel fuel. In another embodiment, the internal combustion engine is comprised of a spark ignition type internal combustion engine. In this case, the fuel is comprised of gasoline.

The exhaust post-treatment device 20 is provided with an exhaust pipe 21 which is connected to the outlet of the exhaust turbine 7t, a catalytic converter 22 which is connected to the exhaust pipe 21, and an exhaust pipe 23 which is connected to the catalytic converter 22. Inside the catalytic converter 22, a wall flow type particulate filter 24 is arranged.

The catalytic converter 22 is provided with a temperature sensor 25 for detecting the temperature of the particulate filter 24. In another embodiment, a temperature sensor for detecting the temperature of the exhaust gas which flows into the particulate filter 24 is arranged in the exhaust pipe 21. In still another embodiment, a temperature sensor for detecting the temperature of the exhaust gas which flows out from the particulate filter 24 is arranged in the exhaust pipe 23. These temperatures of the exhaust gas express the temperature of the particulate filter 24.

The catalytic converter 22 is further provided with a pressure loss sensor 26 for detecting a pressure loss of the particulate filter 24. In the embodiment which is shown in FIG. 1, the pressure loss sensor 26 is comprised of a pressure difference sensor for detecting the pressure difference between the upstream and downstream sides of the particulate filter 24. In another embodiment, the pressure loss sensor 26 is comprised of a sensor which is attached to the exhaust pipe 21 and detects an engine back pressure.

On the other hand, at the exhaust manifold 5, a fuel adding valve 27 is attached. Fuel is supplied to this fuel adding valve 27 from the common rail 16. Fuel is added from the fuel adding valve 27 to the inside of the exhaust manifold 5. In another embodiment, the fuel adding valve 27 is arranged in the exhaust pipe 21.

The electronic control unit 30 is comprised of a digital computer which is provided with components which are connected with each other by a bidirectional bus 31 such as a ROM (read only memory) 32, RAM (random access memory) 33, CPU (microprocessor) 34, input port 35, and output port 36. Output signals of the air flowmeter 8, temperature sensor 25, and pressure difference sensor 26 are input through corresponding AD converters 37 to the input port 35. Further, an accelerator pedal 39 is connected to a load sensor 40 which generates an output voltage proportional to the quantity of depression of the accelerator pedal 39. The output voltage of the load sensor 40 is input through a corresponding AD converter 37 to the input port 35. Furthermore, a crank angle sensor 41 which generates an output pulse each time the crankshaft rotates by for example 30 degrees is connected to the input port 35. At the CPU 34, the output pulses from the crank angle sensor 41 are used as the basis to calculate the engine speed Ne. On the other hand, the output port 36 is connected through corresponding drive circuits 38 to the fuel injectors 3, a drive device of the throttle valve 10, EGR control valve 13, fuel pump 17, and fuel adding valve 27.

Figure 2A:
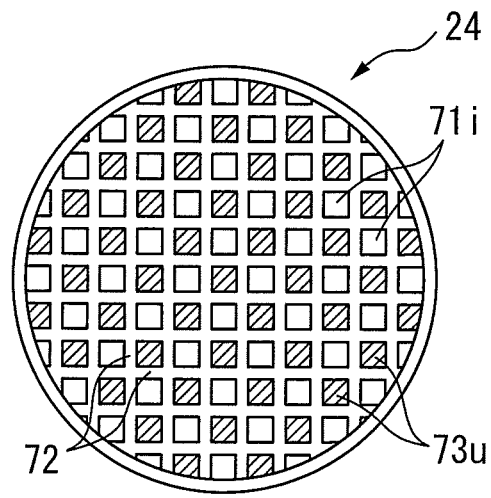
FIG. 2A is a front view of a particulate filter.
Figure 2B:
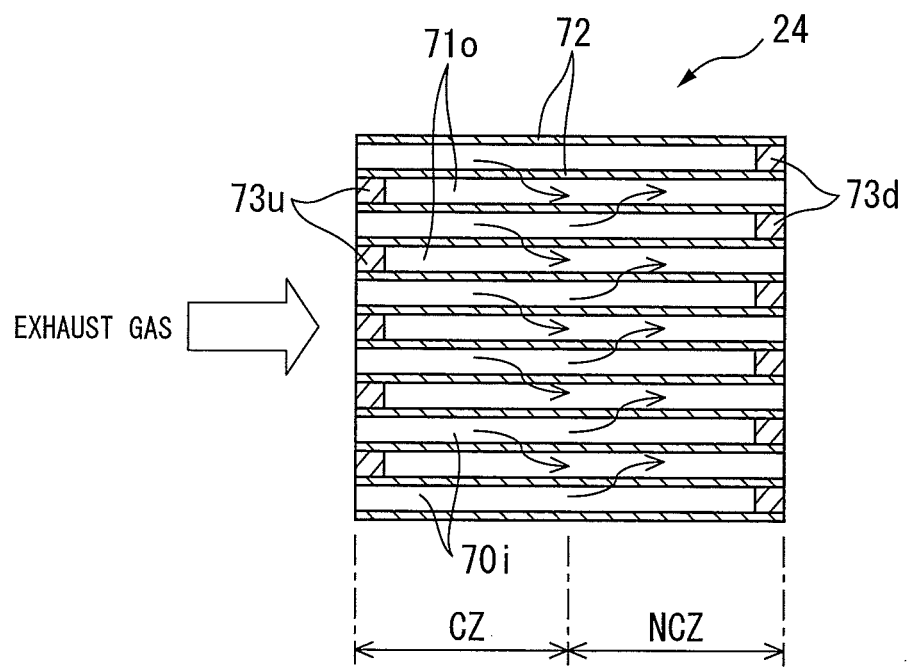
FIG. 2B is a side cross-sectional view of a particulate filter.

FIG. 2A and FIG. 2B show the structure of a wall flow type particulate filter 24. Note that, FIG. 2A shows a front view of the particulate filter 24, while FIG. 2B shows a side cross-sectional view of the particulate filter 24. As shown in FIG. 2A and FIG. 2B, the particulate filter 24 forms a honeycomb structure which is provided with plurality of exhaust flow paths 71$i$ and 71$o$ which extend in parallel with each other and partition walls 72 which separate these exhaust flow paths 71$i$ and 71$o$ from each other. In the embodiment which is shown in FIG. 2A, the exhaust flow paths 71$i$ and 71$o$ are comprised of exhaust gas inflow passages 71$i$ with upstream ends which are open and with downstream ends which are closed by stoppers 73$d$ and exhaust gas outflow passages 71$o$ with upstream ends which are closed by stoppers 73$u$ and with downstream ends which are open. Note that the hatched parts in FIG. 2A show the stoppers 73$u$. Therefore, the exhaust gas inflow passages 71$i$ and exhaust gas outflow passages 71$o$ are alternately arranged via thin partition walls 72. In other words, the exhaust gas inflow passages 71$i$ and exhaust gas outflow passages 71$o$ are arranged so that each exhaust gas inflow passage 71$i$ is surrounded by four exhaust gas outflow passages 71$o$ and each exhaust gas outflow passage 71$o$ is surrounded by four exhaust gas inflow passages 71$i$. In another embodiment, the exhaust flow path is comprised of exhaust gas inflow passages with upstream ends and downstream ends which are open and exhaust gas outflow passages with upstream ends which are closed by stoppers and with downstream ends which are open.

Figure 3:
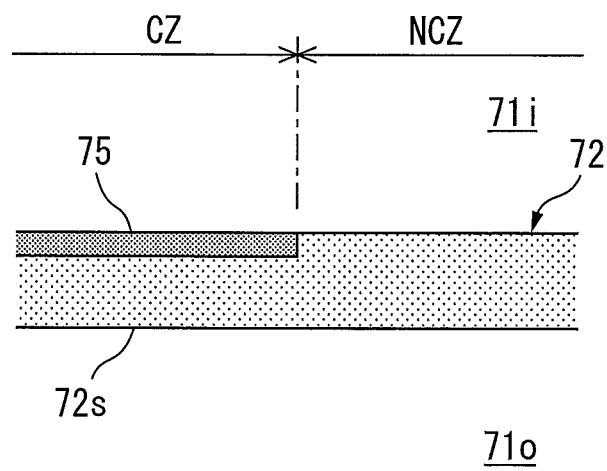
FIG. 3 is a partial enlarged cross-sectional view of a partition wall.

As shown in FIG. 2B, in the partition walls 72, coated zones CZ and non-coated zones NCZ which are positioned at the downstream sides of the coated zones CZ are defined. As shown in FIG. 3, at each coated zone CZ, the surface of the substrate 72$s$ of the partition wall 72 is covered by a coated layer 75. As opposed to this, at each non-coated zone NCZ, the surface of the substrate 72$s$ of the partition wall 72 is not covered by the above-mentioned coated layer 75.

In the embodiment which is shown in FIG. 3, the coated layer 75 is provided at the one surface of the partition wall substrate 72$s$ which faces the exhaust gas inflow passage 71$i$.

In another embodiment, the coated layer 75 is provided at the one surface of the partition wall substrate 72$s$ which faces the exhaust gas outflow passage 71$o$. In still another embodiment, the coated layer 75 is provided at both surfaces of the partition wall substrate 72$s$ which face the exhaust gas inflow passage 71$i$ and exhaust gas outflow passage 71$o$.

Further, in the embodiment which is shown in FIG. 3, the partition wall substrate 72$s$ at the coated zone CZ is thinner than the partition wall substrate 72$s$ at the non-coated zone NCZ and the thickness of the partition wall 72 at the coated zone CZ and the thickness of the partition wall 72 at the non-coated zone NCZ is substantially equal to each other. Therefore, the flow area of the exhaust gas inflow passage 71$i$ at the coated zone CZ and the flow area of the exhaust gas inflow passage 71$i$ at the non-coated zone NCZ are substantially equal to each other. In another embodiment, the thickness of the partition wall substrate 72$s$ at the coated zone CZ and the thickness of the partition wall substrate 72$s$ at the non-coated zone NCZ is substantially equal and the flow area of the exhaust gas inflow passage 71$i$ at the coated zone CZ is smaller than the flow area of the exhaust gas inflow passage 71$i$ at the non-coated zone NCZ by the amount of the coated layer 75.

Furthermore, in the embodiment which is shown in FIG. 2B, the upstream edges of the coated zones CZ substantially match the upstream ends of the partition walls 72. In another embodiment, the upstream edges of the coated zones CZ are positioned at the downstream sides from the upstream ends of the partition walls 72. Further, in the embodiment which is shown in FIG. 2B, the downstream edges of the non-coated zones NCZ substantially match the downstream ends of the partition walls 72. In another embodiment, the downstream edges of the non-coated zones NCZ are positioned at the upstream sides from the downstream ends of the partition walls 72. The longitudinal direction lengths of the coated zones CZ are set to, for example, 50% to 90% of the longitudinal direction lengths of the particulate filter 24.

The partition wall substrates 72$s$ are formed from a porous material, for example, cordierite, silicon carbide, silicon nitride, zirconia, titania, alumina, silica, mullite, lithium aluminum silicate, zirconium phosphate, and other such ceramics.

Figure 4:
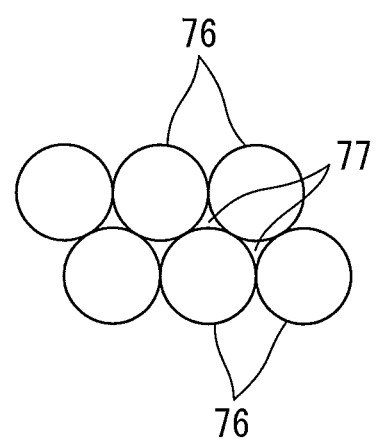
FIG. 4 is a partial enlarged cross-sectional view of a coated layer.

On the other hand, each coated layer 75, as shown in FIG. 4, is formed from a large number of particles 76 and has a large number of clearances or pores 77 between the particles 76. Therefore, the coated layer 75 has porosity. Therefore, as shown in FIG. 2B by the arrows, the exhaust gas first flows into the exhaust gas inflow passages 71$i$, then passes through the surrounding partition walls 72 and flows out into the adjoining exhaust gas outflow passages 71$o$.

In the embodiment which is shown in FIG. 4, the particles 76 are comprised of a metal which has an oxidation function. As the metal which has an oxidation function, platinum Pt, rhodium Rh, palladium Pd, or other such platinum group metals can be used. In another embodiment, the particles 76 are comprised of a ceramic similar to the partition wall substrates 72$s$. In still another embodiment, the particles 76 are comprised of one or both of a ceramic and a metal.

The average pore size of the partition wall substrates 72$s$ is set to 25 μm to 50 μm. If the average pore size of the partition wall substrates 72$s$ is 25 μm or more, the majority of the ash which is contained in the exhaust gas can pass through the partition walls 72. Therefore, in other words, the pore size of the partition walls 72 is set so that the ash which is contained in the exhaust gas can pass through the partition walls 72 in the non-coated zones NCZ. Note that, considering the fact that the average particle size of the particulate matter is smaller than the average particle size of the ash, it is also possible to view the pore size of the partition walls 72 as being set so as to enable the particulate matter and the ash to pass through the partition walls 72 in the non-coated zones NCZ. On the other hand, if the average pore size of the partition wall substrates 72s is 50 μm or less, the mechanical strength of the partition walls 72 can be secured.

The average pore size of the coated layers 75 is set smaller than the average pore size of the partition wall substrates 72s. Specifically, the average pore size of the coated layers 75 is set so that the coated layers 75 can trap the particulate matter which is contained in the exhaust gas. Furthermore, the average size of the particles 76 (secondary particles) is set to 1 μm to 10 μm. If the average size of the particles 76 is smaller than 1 μm, the quantity of particulate matter which passes through the coated layers 75 becomes larger than the allowable amount. Further, if the average size of the particles 76 is larger than 10 μm, the pressure loss of the particulate filter 24 or coated layers 75 becomes larger than the allowable value.

Now then, exhaust gas contains particulate matter which is mainly formed from solid carbon. This particulate matter is trapped on the particulate filter 24.

Further, exhaust gas also contains ash. This ash is also trapped together with the particulate matter at the particulate filter 24. The fact that this ash is mainly formed from a calcium salt such as calcium sulfate $CaSO_4$ or calcium zinc phosphate $Ca_{19}Zn_2(PO_4)_{14}$ was confirmed by the present inventors. The calcium Ca, zinc Zn, phosphorus P, etc. are derived from the engine lubricating oil, while the sulfur S is derived from the fuel. That is, if explaining calcium sulfate $CaSO_4$ as an example, the engine lubricating oil flows into the combustion chambers 2 where it is burned. The calcium Ca in the lubricating oil bonds with the sulfur S in the fuel, whereby calcium sulfate $CaSO_4$ is produced.

According to the present inventors, it was confirmed that when arranging a conventional particulate filter with an average pore size of 10 μm to 25 μm or so and not provided with coated layers 75, in other words, a particulate filter through which ash does not pass much at all, inside the engine exhaust passage, the particulate matter will tend to build up at the upstream side parts of the partition walls 72 rather than the downstream side parts of the partition walls 72 and that the ash will tend to build up at the downstream side parts of the partition walls 72 rather than the upstream side parts of the partition walls 72.

Therefore, in the embodiment according to the present invention, the coated zones CZ are provided at the upstream sides of the partition walls 72 and the non-coated zones NCZ are provided at the downstream sides of the partition walls 72. As a result, the particulate matter is trapped at the coated layers 75 at the upstream side coated zones CZ, and the ash passes through the partition walls 72 at the downstream side non-coated zones NCZ. Therefore, it is possible to suppress the passage of the particulate matter through the particulate filter 24 while suppressing the buildup of the ash at the particulate filter 24. In other words, it is possible to reliably trap the particulate matter while suppressing an increase of the pressure loss of the particulate filter 24 due to the ash.

In the combustion chambers 2, fuel is burned under an excess of oxygen. Therefore, insofar as fuel is not secondarily fed from the fuel injectors 3 and the fuel adding valve 27, the particulate filter 24 will be in an oxidizing atmosphere. Further, the coated layers 75 are comprised of a metal which has an oxidation function. As a result, the particulate matter which is trapped at the coated layers 75 is successively oxidized. In this regard, if the quantity of particulate matter which is trapped per unit time becomes greater than the quantity of particulate matter which is oxidized per unit time, the quantity of particulate matter which is trapped on the particulate filter 24 will increase along with the elapse of the engine operating time.

FIG. 5A to FIG. 5E show the trapping mechanism of the particulate filter 24 in the case where the quantity of particulate matter which is trapped on the particulate filter 24 increases together with the elapse of the engine operating time.

Figure 5A:
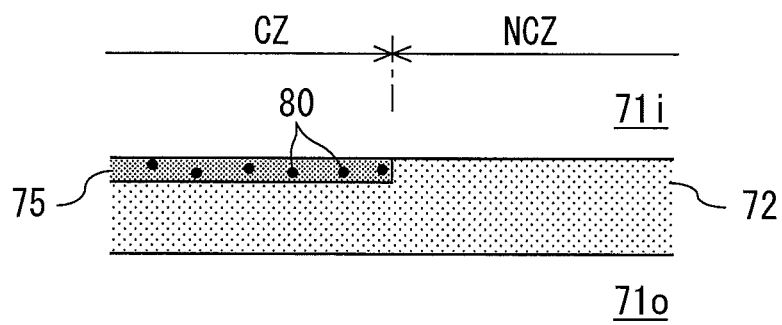
FIG. 5A is a schematic view which explains a trapping mechanism of the particulate filter.

When the engine operating time is short, that is, at the initial period of engine operation, as shown in FIG. 5A, the particulate matter 80 is mainly trapped inside the pores of the coated layers 75 in the coated zones CZ. In this case, the particulate matter does not reach the non-coated zones NCZ much at all. Note that, the state of zero engine operating time corresponds to the state where the particulate filter 24 has not yet been used. As the engine operating time elapses, the quantity of particulate matter which is trapped inside the pores of the coated layers 75 increases.

Figure 5B:
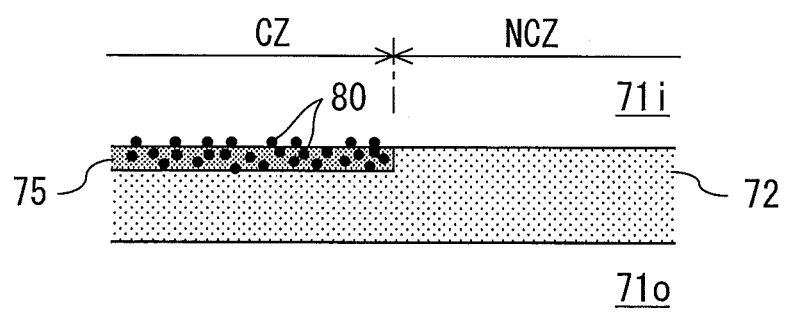
FIG. 5B is a schematic view which explains the trapping mechanism of the particulate filter.

When the engine operating time further elapses, as shown in FIG. 5B, the particulate matter 80 is mainly trapped on the surfaces of the coated layers 75. As the engine operating time further elapses, the quantity of particulate matter which is trapped on the surfaces of the coated layers 75 increases.

Figure 5C:
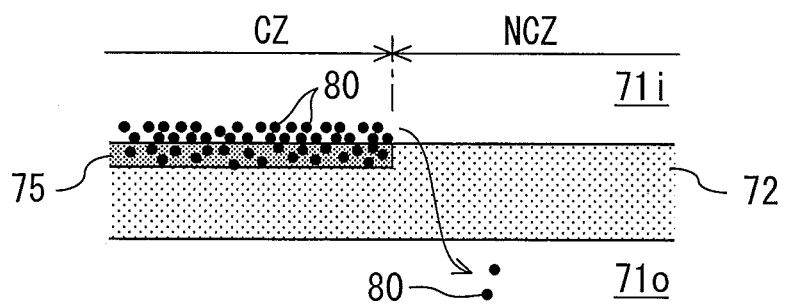
FIG. 5C is a schematic view which explains the trapping mechanism of the particulate filter.

When the engine operating time further elapses, as shown in FIG. 5C, the particulate matter 80 reaches the non-coated zones NCZ and passes through the partition walls 72. At this time, the quantity of particulate matter which is trapped at the coated zones CZ will not increase much at all.

Figure 5D:
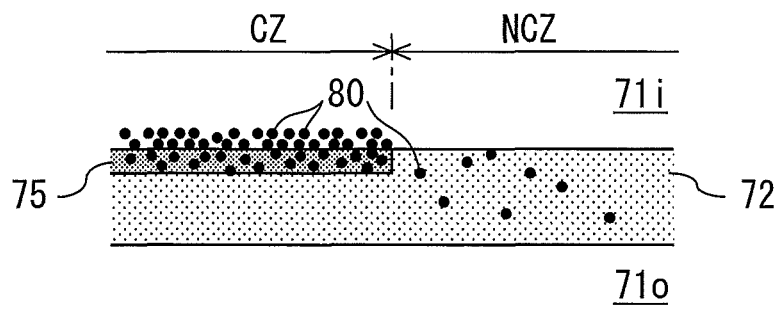
FIG. 5D is a schematic view which explains the trapping mechanism of the particulate filter.

When the engine operating time further elapses, part of the particulate matter which reaches the non-coated zones NCZ strikes the wall surfaces inside the pores of the partition walls 72 and is trapped inside the pores of the partition walls 72. That is, as shown in FIG. 5D, the particulate matter 80 is mainly trapped in the pores of the partition walls 72 at the non-coated zones NCZ. As the engine operating time further elapses, the quantity of particulate matter which is trapped inside the pores of the partition walls 72 at the non-coated zones NCZ increases.

Figure 5E:
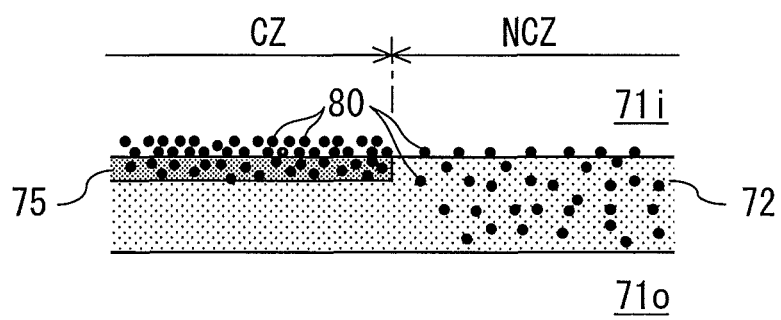
FIG. 5E is a schematic view which explains the trapping mechanism of the particulate filter.

When the engine operating time further elapses, as shown in FIG. 5E, the particulate matter 80 is mainly trapped on the surfaces of the partition walls 72 at the non-coated zones NCZ. As the engine operating time further elapses, the quantity of particulate matter which is trapped on the surfaces of the partition walls 72 at the non-coated zones NCZ increases.

Figure 6:
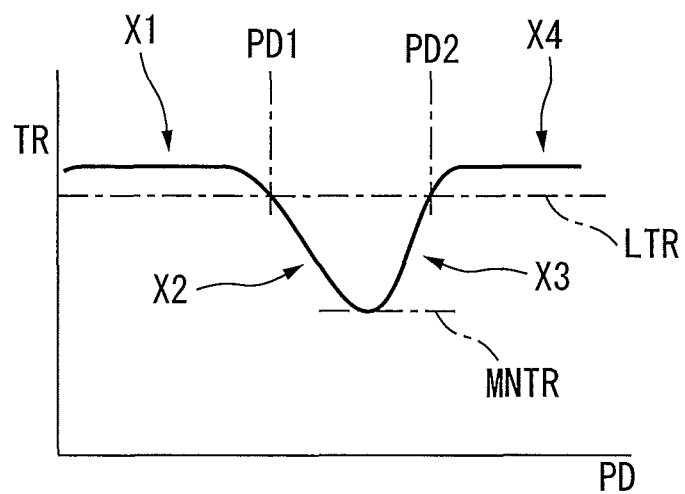
FIG. 6 is a graph which shows the particulate matter trapping rate of the particulate filter with regard to the pressure difference of the particulate filter.

FIG. 6 shows the particulate matter trapping rate TR of such a particulate filter 24 as a function of the pressure difference PD of the particulate filter 24. The pressure difference PD expresses the pressure loss of the particulate filter 24 and is detected by the pressure difference sensor 26 (FIG. 1). Alternatively, the pressure difference PD expresses the quantity of particulate matter which is trapped on the particulate filter 24. Further, alternatively, the pressure difference PD expresses the engine operating time. On the other hand, the particulate matter trapping rate TR is expressed by the following formula (1) using the quantity of particulate matter qPMi which flows into the particulate filter 24 per unit time and the quantity of particulate matter qPMo which flows out of the particulate filter 24 per unit time $$TR=(qPMi-qPMo)/qPMi \quad (1)$$

When the pressure difference PD is small, as shown in FIG. 6 by X1, the particulate matter trapping rate TR is maintained substantially constant regardless of the increase of the pressure difference PD or increases along with an increase of the pressure difference PD. This is because the particulate matter is mainly trapped in the pores or on the surface of the coated layer 75 (see FIG. 5A and FIG. 5B).

When the pressure difference PD further increases, as shown in FIG. 6 by X2, the particulate matter trapping rate TR falls along with the increase of the pressure difference PD. This is because the particulate matter mainly passes through the partition walls 72 at the non-coated zones NCZ (see FIG. 5C).

When the pressure difference PD further increases, as shown in FIG. 6 by X3, the particulate matter trapping rate TR increases through a local minimum value MNTR along with the increase of the pressure difference PD. This is because the particulate matter is mainly trapped in the pores of the partition walls 72 in the non-coated zones NCZ (see FIG. 5D).

When the pressure difference PD further increases, as shown in FIG. 6 by X4, the particulate matter trapping rate TR is maintained substantially constant regardless of the increase of the pressure difference PD or increases along with the increase of the pressure difference PD. This is because the particulate matter is mainly trapped on the surfaces of the partition walls 72 in the non-coated zones NCZ (see FIG. 5E).

Therefore, particulate filter 24 can be said to be comprised of a particulate filter where the particulate matter trapping rate of the particulate filter is maintained substantially constant regardless of an increase of a pressure loss of the particulate filter or increases along with the increase of the pressure loss of the particulate filter when the pressure loss of the particulate filter is small and falls along with the increase of the pressure loss of the particulate filter when the pressure loss of the particulate filter further increases. Alternatively, the particulate filter 24 is comprised of a particulate filter where the particulate matter trapping rate of the particulate filter is maintained substantially constant regardless of an increase of a pressure loss of the particulate filter or increases along with the increase of the pressure loss of the particulate filter when the pressure loss of the particulate filter is small and, when the pressure loss of the particulate filter further increases, falls along with the increase of the pressure loss of the particulate filter and increases through the local minimum value MNTR.

Furthermore, referring to FIG. 6, when the pressure difference PD is smaller than a threshold value PD1, the particulate matter trapping rate TR is maintained higher than an allowable lower limit value LTR. If the pressure difference PD becomes larger than the threshold value PD1, the particulate matter trapping rate TR will fall below the allowable lower limit value LTR. Next, if the pressure difference PD becomes greater than the threshold value PD2, it will increase over the allowable lower limit value LTR and be maintained higher than the allowable lower limit value LTR.

Therefore, the particulate filter 24 is comprised of a particulate filter where the particulate matter trapping rate of the particulate filter is maintained higher than an allowable lower limit value regardless of an increase of a pressure loss of the particulate filter when the pressure loss of the particulate filter is small, and falls along with the increase of the pressure loss of the particulate filter and falls below the allowable value when the pressure loss further increases. Alternatively, the particulate filter 24 is comprised of a particulate filter where the particulate matter trapping rate of the particulate filter is maintained higher than the allowable lower limit value LTR regardless of an increase of a pressure loss of the particulate filter when the pressure loss of the particulate filter is small, falls along with the increase of the pressure loss of the particulate filter and falls below the allowable lower limit value LTR when the pressure loss of the particulate filter further increases, and increases along with the increase of the pressure loss of the particulate filter and increases over the allowable lower limit value LTR when the pressure loss of the particulate filter further increases.

Figure 7:
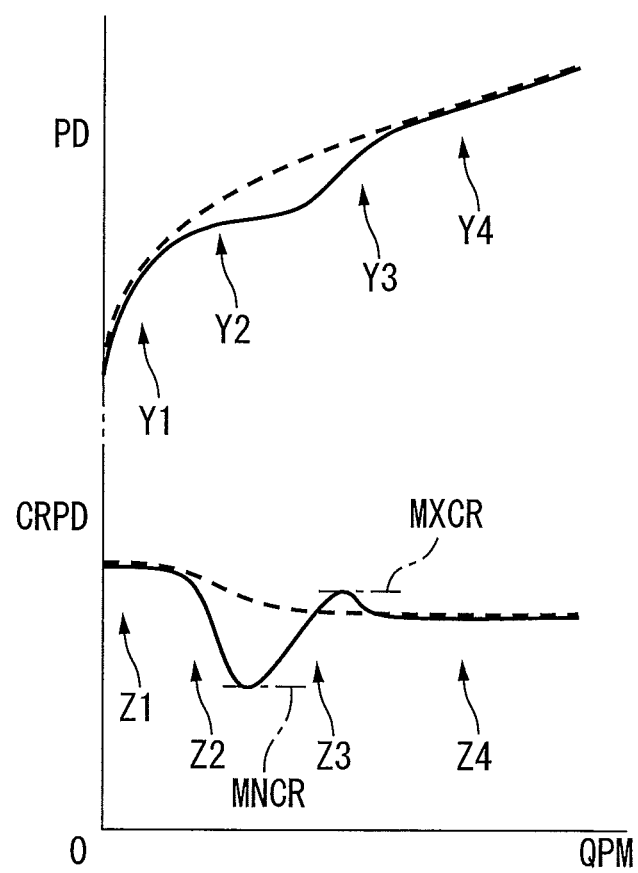
FIG. 7 is a graph which shows the pressure difference with regard to the particulate matter trapped quantity of the particulate filter.

FIG. 7 shows the pressure difference PD of the particulate filter 24 and the change rate CRPD of the pressure difference PD as a function of the quantity of particulate matter QPM which is trapped at the particulate filter 24. The particulate matter trapped quantity QPM expresses the engine operating time. Note that, in FIG. 7, the solid lines show the case of the embodiment according to the present invention, while the broken lines show the case of the above-mentioned conventional particulate filter.

When the particulate matter trapped quantity QPM is small, as shown in FIG. 7 by Y1, the pressure difference PD increases relatively rapidly. Therefore, as shown in FIG. 7 by Z1, it is maintained substantially constant regardless of the increase of the particulate matter trapped quantity QPM or increases along with an increase of the particulate matter trapped quantity QPM. This is because the particulate matter is mainly trapped in the pores of the coated layers 75 (see FIG. 5A).

When the particulate matter trapped quantity QPM further increases, as shown in FIG. 7 by Y2, the pressure difference PD increases relatively gently. Therefore, as shown in FIG. 7 by Z2, the change rate of the pressure difference CRPD decreases along with the increase of the particulate matter trapped quantity QPM. This is because the particulate matter is mainly trapped on the surfaces of the coated layers 75 (see FIG. 5B).

When the particulate matter trapped quantity QPM further increases, as shown in FIG. 7 by Y3, the pressure difference PD increases relatively rapidly. Therefore, as shown in FIG. 7 by Z3, it increases through the local minimum value MNCR along with the increase of the particulate matter trapped quantity QPM. This is because the particulate matter is mainly trapped in the pores of the partition walls 72 in the non-coated zones NCZ (see FIG. 5D).

When the particulate matter trapped quantity QPM further increases, as shown in FIG. 7 by Y4, the pressure difference PD increases relatively gently. Therefore, as shown in FIG. 7 by Z4, the change rate of the pressure difference CRPD decreases through the local maximum value MXCR along with the increase of the particulate matter trapped quantity QPM and then is maintained substantially constant. This is because the particulate matter is mainly trapped on the surfaces of the partition walls 72 in the non-coated zones NCZ (see FIG. 5E).

Therefore, the particulate filter 24 can also be said to be comprised of a particulate filter where the change rate of the pressure loss of the particulate filter to the particulate matter trapped quantity on the particulate filter is maintained substantially constant regardless of the increase of the particulate matter trapped quantity or increases along with the increase of the particulate matter trapped quantity when the particulate matter trapped quantity is small and, when the particulate matter trapped quantity further increases, falls along with an increase of the particulate matter trapped quantity and increases through a local minimum value. Alternatively, the particulate filter 24 is comprised of a particulate filter where the change rate of the pressure loss of the particulate filter to the particulate matter trapped quantity on the particulate filter is maintained substantially constant regardless of the increase of the particulate matter trapped quantity or increases along with the increase of the particulate matter trapped quantity when the particulate matter trapped quantity is small and, when the particulate matter trapped quantity further increases, falls along with an increase of the particulate matter trapped quantity and increases through a local minimum value and, when the particulate matter trapped quantity further increases, decreases through a local maximum value and then is maintained substantially constant.

As opposed to this, in the case of the conventional particulate filter which is shown in FIG. 7 by the broken lines, no local minimum value and local maximum value occur in the change rate of pressure difference CRPD.

Now then, as explained with reference to FIG. 6, if the pressure difference PD becomes larger than the threshold value or allowable upper limit value PD1, the particulate matter trapping rate TR will fall from the allowable lower limit value LTR. That is, the quantity of particulate matter which passes through the particulate filter 24 will become unpreferably greater. The allowable upper limit value PD1 can, for example, be found in advance by experiments.

On the other hand, if making the particulate filter 24 rise in temperature in an oxidizing atmosphere, the particulate matter which is trapped at the particulate filter 24 will be removed by oxidation.

Therefore, in the embodiment according to the present invention, when the pressure difference PD becomes larger than the threshold value PD1, the particulate matter on the particulate filter 24 is removed by PM removal processing. As a result, before the particulate matter starts to pass through the partition walls 72 in the non-coated zones NCZ, the particulate matter will be removed from the particulate filter 24, in particular the coated zones CZ. Therefore, it is suppressed that the particulate matter reaches the non-coated zones NCZ, and it is also suppressed that the particulate matter passes through the partition walls 72 in the non-coated zones NCZ.

In the embodiment according to the present invention, the PM removal processing is comprised of temperature raising processing which makes the temperature of the particulate filter 24 rise up to the PM removal temperature in order to remove the particulate matter by oxidation. In another embodiment, the PM removal processing is comprised of $NO_x$ increase processing which increases the amount of $NO_x$ in the exhaust gas which flows into the particulate filter 24 in order to remove particulate matter by oxidation using $NO_x$. To increase the amount of $NO_x$, for example, the amount of EGR gas is decreased. In still another embodiment, the PM removal processing is comprised of ozone supply processing which supplies ozone to the particulate filter 24 from an ozone feeder which is connected upstream of the particulate filter 24 in the exhaust passage in order to remove particulate matter by oxidation using ozone.

Figure 8:
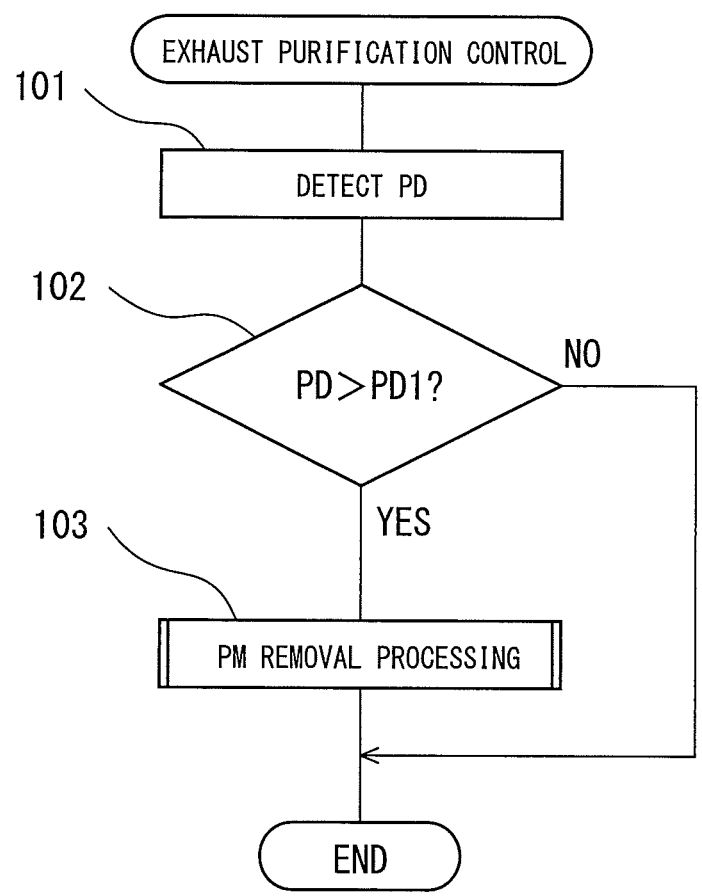
FIG. 8 is a flow chart which shows a routine for performing exhaust purification control of an embodiment according to the present invention.

FIG. 8 shows the routine for performance of exhaust purification control of the embodiment according to the present invention. Referring to FIG. 8, at step 101, the pressure difference PD of the particulate filter 24 is detected. At the following step 102, it is judged if the pressure difference PD is larger than the allowable upper limit value PD1. When PD≤PD1, the processing cycle is ended. When PD>PD1, the routine proceeds to step 103 where PM removal processing is performed.

Figure 9:
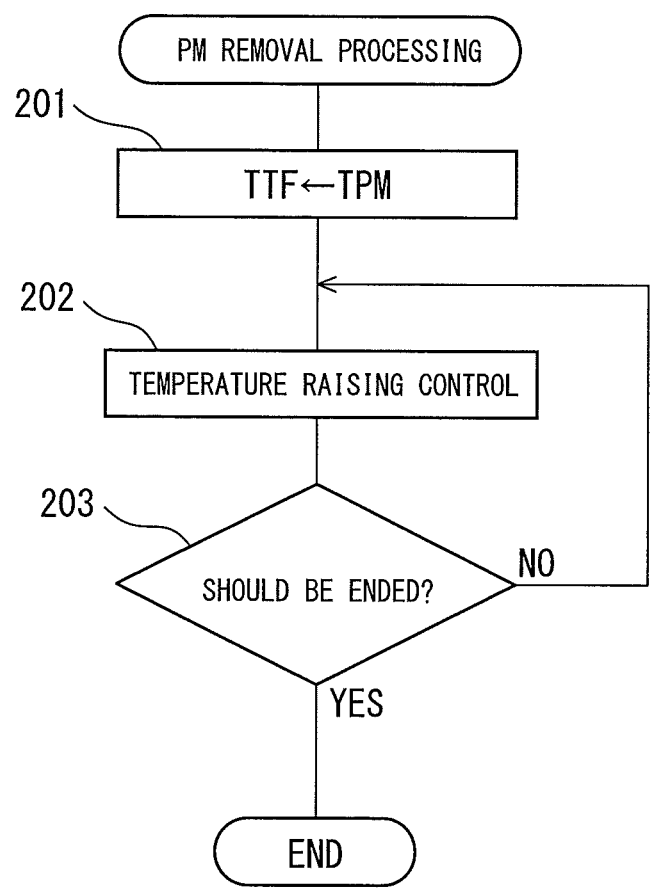
FIG. 9 is a flow chart which shows a routine for performing the PM removal processing.

FIG. 9 show the routine for performing the PM removal processing of the embodiment according to the present invention. Referring to FIG. 9, at step 201, the target temperature TTF is set to a preset PM removal temperature TPM. The PM removal temperature TPM is, for example, 600° C. At the following step 202, temperature raising control is performed to raise the temperature TF of the particulate filter 24 to the target temperature TTF and maintain it there. To make the particulate filter 24 rise in temperature, in one embodiment, the fuel which is added from the fuel adding valve 27 is burned at the exhaust passage or particulate filter 24. In another embodiment, the fuel which is secondarily injected from the fuel injector 3 is burned at the combustion chambers 2, exhaust passage, or particulate filter 24.

At the following step 203, it is judged if temperature raising control or PM removal processing should be ended. In the embodiment according to the present invention, the quantity of particulate matter which is trapped at the particulate filter 24 is found. When the found particulate matter trapped quantity is reduced to the threshold value, it is judged that PM removal processing should be ended. The particulate matter trapped quantity, in one embodiment, is expressed by finding the amount of increase of the particulate matter trapped quantity which increases per unit time and the amount of decrease of the particulate matter trapped quantity which decreases per unit time based on the engine operating state and totaling the amount of increase and amount of decrease to obtain a count value. In another embodiment, the pressure difference PD of the particulate filter 24 is used to express the particulate matter trapped quantity. When the PM removal processing should not be ended, the routine returns to step 202 where the temperature raising control is continued. When the PM removal processing should be ended, the processing cycle is ended. Therefore, the temperature raising control is made to end.

In the embodiment according to the present invention, the non-coated zones NCZ are not provided with coated layers. In another embodiment, the non-coated zones NCZ are provided with separate coated layers which are different from the coated layers 75. In this case, the average pore size of the partition walls 72 in the non-coated zones NCZ is set to 25 µm to 50 µm in the state where the separate coated layers are provided. The separate coated layers are, for example, formed from catalytic coated layers which carry a metal which has an oxidation function. As a result, it is possible to easily remove by oxidation the particulate matter which reaches the non-coated zones NCZ.

Further, in the embodiment according to the present invention, the coated layers 75 is a substantially uniform thickness across the exhaust gas flow direction. In another embodiment, the coated layers 75 are thinner more toward the downstream ends. If doing this, it is possible to suppress the increase in pressure loss due to the coated layers 75 while reliably trapping particulate matter.

Next, another embodiment according to the present invention will be explained.

As explained with reference to FIG. 7, when the change rate of pressure difference PD increases via the local minimum value MNCR, the particulate matter is mainly trapped in the pores of the partition walls 72 in the non-coated zones NCZ (see FIG. 5D). At this time, part of the particulate matter is liable to pass through the partition walls 72 in the non-coated zones NCZ.

Therefore, in another embodiment according to the present invention, the change rate of pressure difference CRPD is repeatedly found and PM removal processing is performed when a local minimum value MNCR occurs in the change rate of pressure difference CRPD. As a result, passage of the particulate matter through the partition walls 72 in the non-coated zones NCZ is suppressed.

Figure 10:
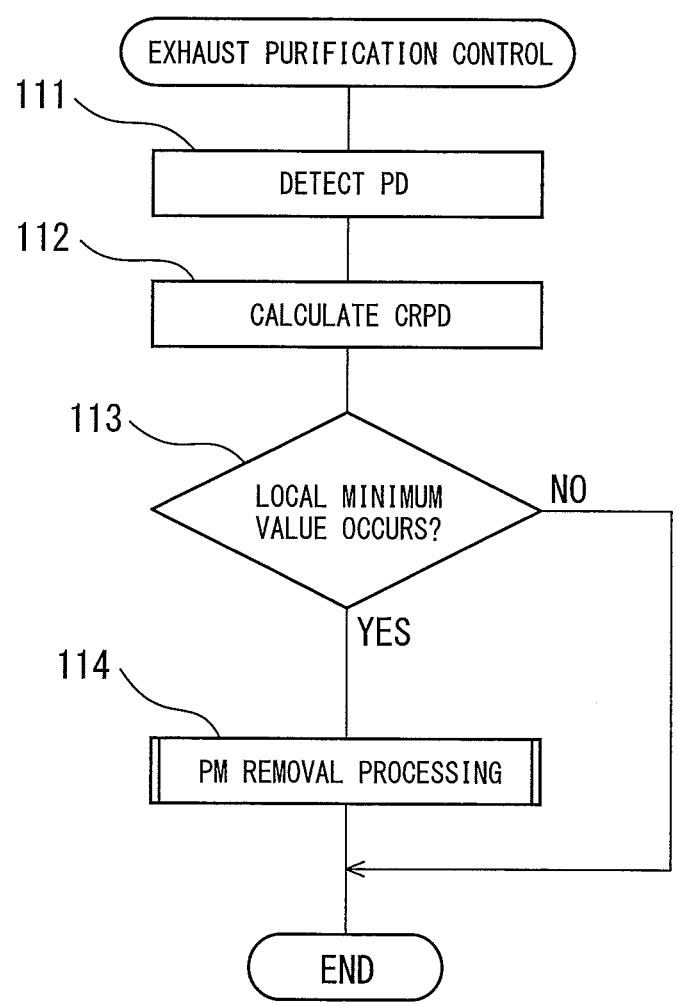
FIG. 10 is a flow chart which shows a routine for performing exhaust purification control of another embodiment according to the present invention.

FIG. 10 shows the routine for performing the exhaust purification control of another embodiment according to the present invention. Referring to FIG. 10, at step 111, the pressure difference PD of the particulate filter 24 is detected. At the following step 112, the change rate of the pressure difference CRPD is calculated. At the following step 113, it is judged if a local minimum value MNCR has occurred in the change rate of pressure difference CRPD. When no local minimum value MNCR has occurred in the change rate of pressure difference CRPD, the processing cycle is ended. When a local minimum value MNCR has occurred in the change rate of pressure difference CRPD, the routine proceeds to step 114 where the PM removal processing is executed.

The rest of the configuration and actions of another embodiment according to the present invention are similar to the configuration and actions of the above embodiments according to the present invention, so explanations will be omitted.

Figure 11:
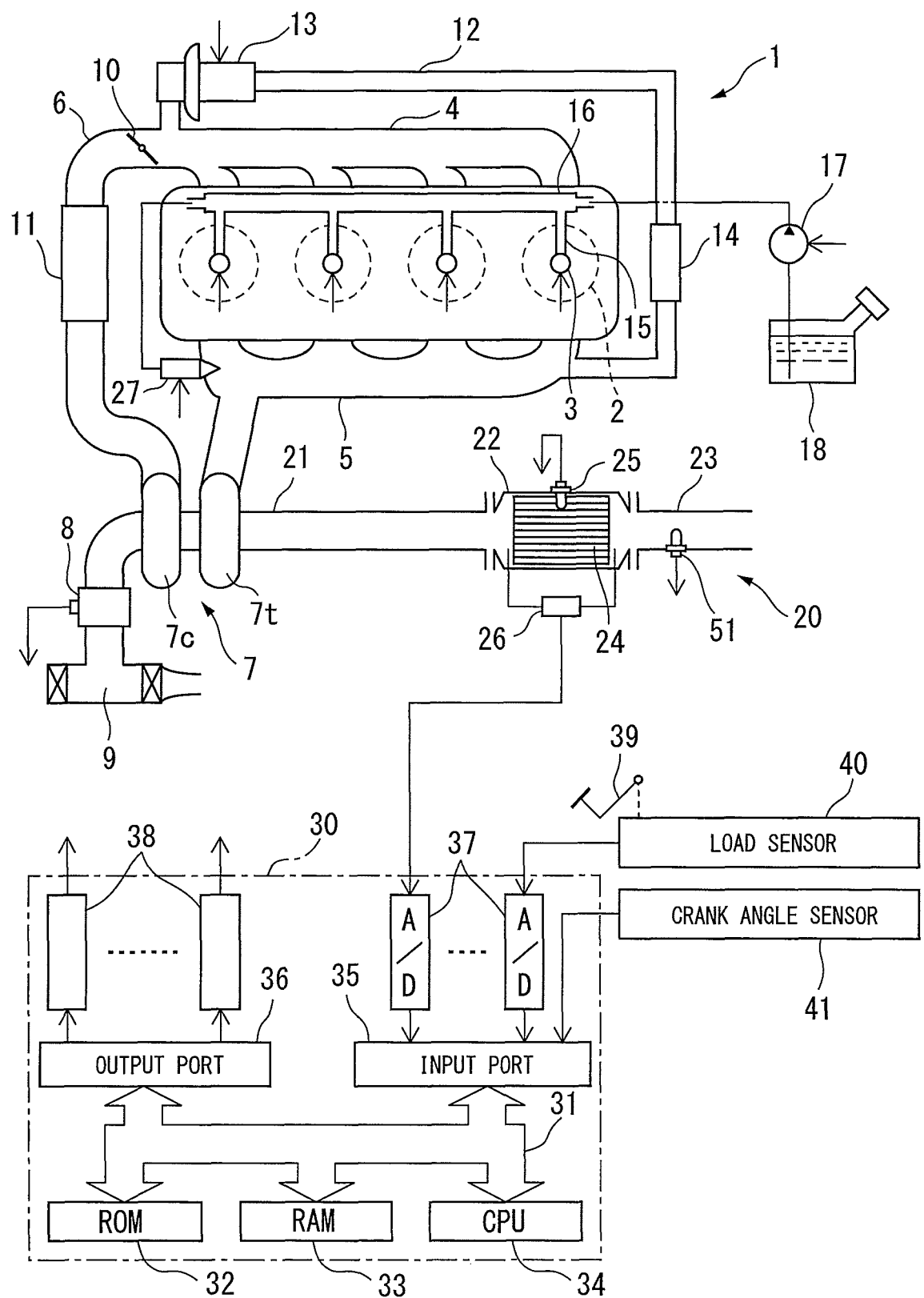
FIG. 11 is an overview of an internal combustion engine of still another embodiment according to the present invention.

Next, still another embodiment according to the present invention will be explained. In still another embodiment according to the present invention, as shown in FIG. 11, downstream of the particulate filter 24 in the exhaust pipe 23, a particulate matter sensor 51 is attached for detecting the quantity of particulate matter in the inflowing exhaust gas.

Further, in still another embodiment according to the present invention, the quantity of particulate matter which flows into the particulate filter 24 is found, the quantity of particulate matter which flows out from the particulate filter 24 is found, and these found quantities of particulate matter are used as the basis to find the particulate matter trapping rate of the particulate filter TR. In addition to this, it is judged if the found particulate matter trapping rate TR is lower than the allowable lower limit value LTR. When it is judged that the particulate matter trapping rate TR is lower than the allowable lower limit value LTR, the PM removal processing is performed.

Figure 12:
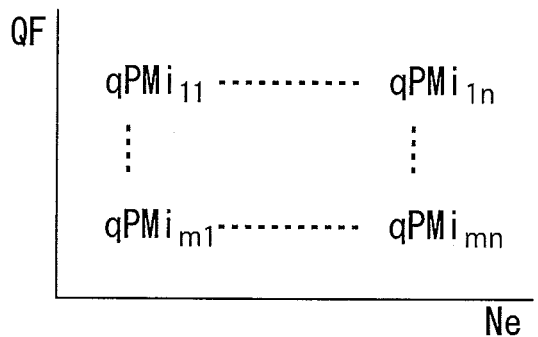
FIG. 12 is a map which shows an amount of increase of the particulate matter trapped quantity which increases per unit time.

Specifically, the quantity of particulate matter qPMi which flows into the particulate filter 24 per unit time is calculated based on the engine operating state. That is, the particulate matter inflow quantity qPMi is stored as a function of the fuel injection quantity QF which expresses the engine load and the engine speed Ne in the form of the map which is shown in FIG. 12 in advance in the ROM 32 and is calculated using this map. In another embodiment, an additional particulate matter sensor which is attached to the exhaust passage upstream of the particulate filter 24 is used to detect the particulate matter inflow quantity qPMi. Further, the quantity of particulate matter qPMo which flows out from the particulate filter 24 per unit time is detected by the particulate matter sensor 51. Furthermore, the above-mentioned formula (1) is used to calculate the particulate matter trapping rate TR.

Figure 13:
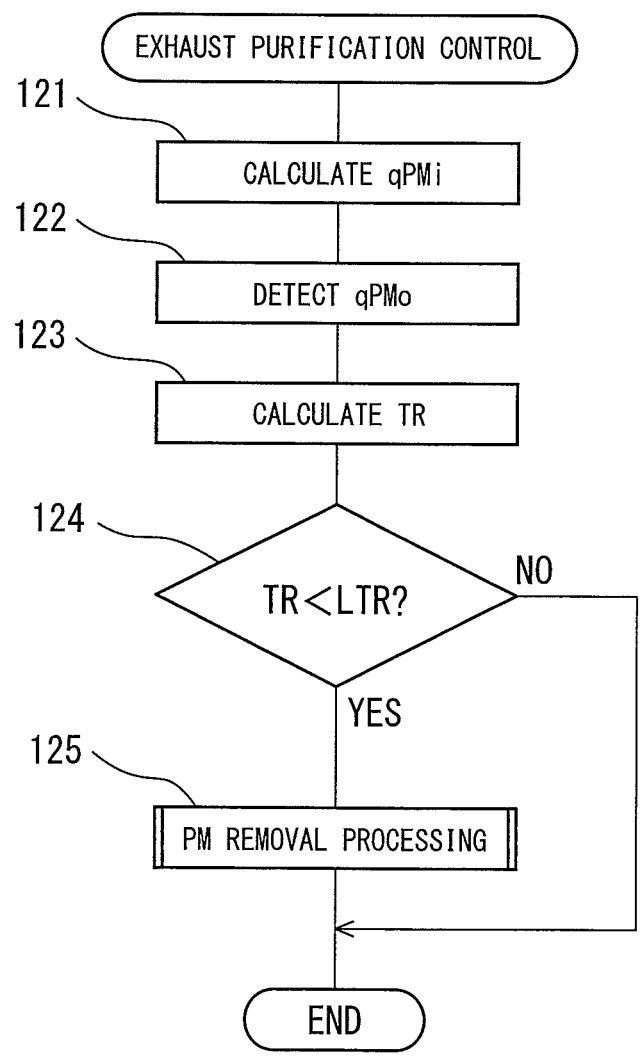
FIG. 13 is a flow chart which shows a routine for performing exhaust purification control of still another embodiment according to the present invention.

FIG. 13 shows the routine for performing the exhaust purification control of still another embodiment according to the present invention. Referring to FIG. 13, at step 121, the particulate matter inflow quantity qPMi is calculated by using the map of FIG. 12. At the following step 122, the particulate matter outflow quantity qPMo is calculated from the output of the particulate matter sensor 51. At the following step 123, the particulate matter trapping rate TR is calculated by using formula (1). At the following step 124, it is judged if the calculated particulate matter trapping rate TR is lower than the allowable lower limit value LTR. When TR≥LTR, the processing cycle is ended. When TR<LTR, next the routine proceeds to step 125 where PM removal processing is performed.

The rest of the configuration and actions of the other embodiment according to the present invention are similar to the configuration and actions of the above embodiments according to the present invention, so explanations will be omitted.

Therefore, if summarizing the embodiments according to the present invention which were explained up to here, these perform judgment processing which judges if the particulate matter trapping rate of the particulate filter has fallen below an allowable lower limit value and perform PM removal processing when it is judged that the particulate matter trapping rate has fallen below the allowable lower limit value. In addition to this, in the embodiment which is shown in FIG. 8, the pressure loss of the particulate filter is detected and it is judged that the particulate matter trapping rate has fallen below the allowable lower limit value when the detected pressure loss increases over the allowable upper limit value. In the embodiment which is shown in FIG. 10, the change rate of the pressure loss of the particulate filter with respect to the particulate matter trapped quantity on the particulate filter 24 is found and it is judged if a local minimum value has occurred in the change rate of the pressure loss. When it is judged that a local minimum value has occurred in the change rate of the pressure loss, it is judged that the particulate matter trapping rate has fallen below the allowable lower limit value. In the embodiment which is shown in FIG. 13, the quantity of particulate matter which flows into the particulate filter is found, the quantity of particulate matter which flows out from the particulate filter is found, these found quantities of particulate matter are used as the basis to find the particulate matter trapping rate of the particulate filter, and it is judged if the found particulate matter trapping rate has fallen below the allowable lower limit value. Note that, the electronic control unit 30 is programmed to perform judgment processing and PM removal processing.

Next, another embodiment of PM removal processing will be explained.

Figure 14:
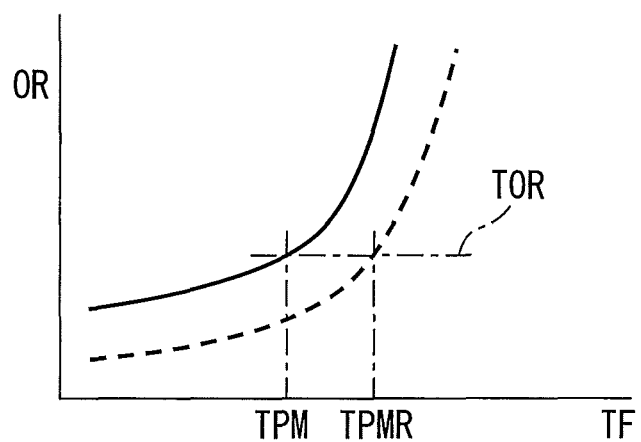
FIG. 14 is a graph which shows an oxidation rate of particulate matter.

In FIG. 14, the solid line shows the oxidation rate OR of particulate matter in the coated zones CZ, while the broken line shows the oxidation rate OR of particulate matter in the non-coated zones NCZ. As will be understood from FIG. 14, if making the temperature TF of the particulate filter 24 the PM removal temperature TPM, it is possible to remove by oxidation the particulate matter which was trapped at the coated zones CZ with the target oxidation rate TOR.

On the other hand, in the embodiments according to the present invention which were explained up to here, in short, PM removal processing is performed at a timing before the quantity of particulate matter which reaches the non-coated zones NCZ becomes great. Therefore, the PM removal processing is this case is mainly performed to remove the particulate matter which is trapped at the coated zones CZ. Therefore, in the embodiment which is shown in FIG. 9, the target temperature TTF is set to the PM removal temperature TPM.

In this regard, even if performing the PM removal processing at the above-mentioned timing, sometimes particulate matter may be trapped at the non-coated zones NCZ. Further, so long as using the PM removal temperature TPM to perform the PM removal processing, it is difficult to quickly remove the particulate matter which is trapped at the non-coated zones NCZ. As a result, the quantity of particulate matter which is trapped at the non-coated zones NCZ may become greater and it is liable to become difficult for the ash to pass through the partition walls 72 at the non-coated zones NCZ.

Therefore, in another embodiment of PM removal processing, the quantity of particulate matter QPMNCZ which is trapped at the non-coated zones NCZ is found, and if PM removal processing is to be performed when the particulate matter trapped quantity QPMNCZ of the non-coated zones NCZ becomes greater than an allowable upper limit amount UPMNCZ, the target temperature TTF is set to a temperature TPMR which is set higher than the PM removal temperature TPM. As a result, the particulate matter which is trapped at the non-coated zones NCZ can be quickly and reliably removed. Therefore, the ash can reliably pass through the partition walls 72 at the non-coated zones NCZ.

Figure 15:
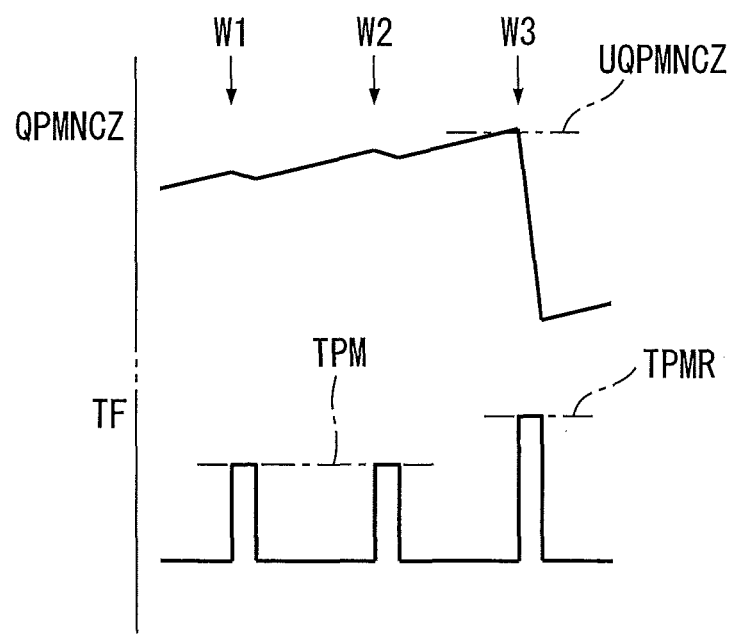
FIG. 15 is a time chart which explains another embodiment of PM removal processing.

That is, as shown in FIG. 15 by W1 and W2, when the particulate matter trapped quantity QPMNCZ of the non-coated zones NCZ is smaller than the allowable upper limit amount UPMNCZ, in the PM removal processing, the temperature TF of the particulate filter 24 is raised to the PM removal temperature TPM. As opposed to this, when the particulate matter trapped quantity QPMNCZ of the non-coated zones NCZ is greater than the allowable upper limit amount UPMNCZ, as shown in FIG. 15 by W3, in the PM removal processing, the temperature TF of the particulate filter 24 is raised to the raised PM removal temperature TPMR. As a result, the particulate matter trapped quantity QPMNCZ of the non-coated zones NCZ is quickly reduced.

The particulate matter trapped quantity QPMNCZ of the non-coated zone NCZ, in one embodiment, is found from the quantity of particulate matter which flows into the particulate filter 24 and the particulate matter trapping efficiency of the non-coated zones NCZ. The particulate matter inflow quantity to the particulate filter 24 and the particulate matter trapping efficiency of the non-coated zones NCZ are, for example, respectively found as a function of the engine operating state in advance in the form of a map in the ROM 32. In another embodiment, the particulate matter trapped quantity QPMNCZ is calculated by using a model formula obtained by modeling the trapping action of particulate matter at the non-coated zones NCZ.

Figure 16:
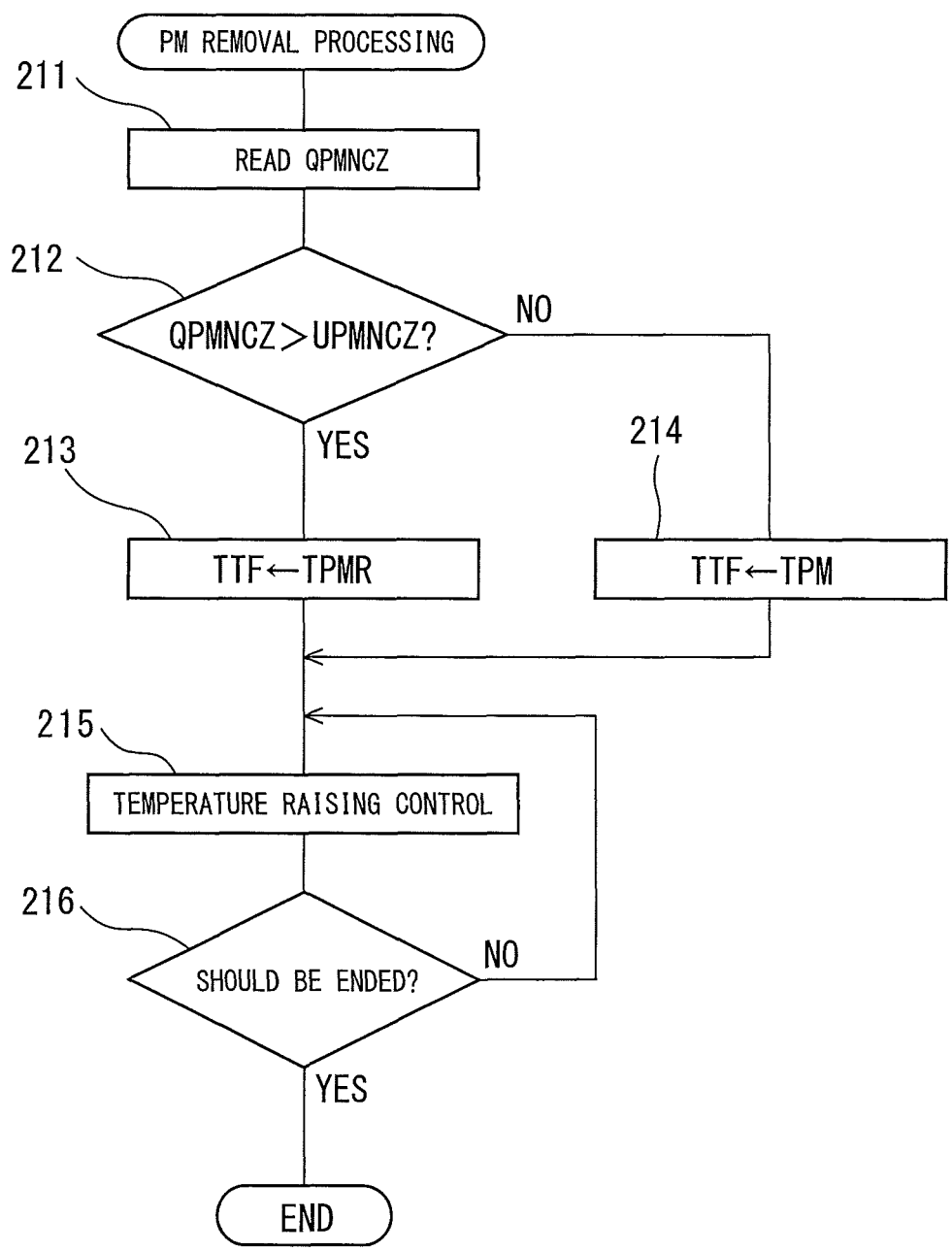
FIG. 16 is a flow chart which shows a routine for performing another embodiment of PM removal processing.

FIG. 16 shows a routine for performing the PM removal processing of the embodiment according to the present invention. Referring to FIG. 16, at step 211, the particulate matter trapped quantity QPMNCZ of the non-coated zones NCZ is read. The particulate matter trapped quantity QPMNCZ is, for example, calculated by a not shown routine. At the following step 212, it is judged if the particulate matter trapped quantity QPMNCZ is greater than an allowable upper limit amount UPMNCZ. When QPMNCZ>UPMNCZ, next the routine proceeds to step 213 where the target temperature TTF is set to the raised PM removal temperature TPMR. Next, the routine proceeds to step 215. As opposed to this, when QPMNCZ≤UPMNCZ, next the routine proceeds to step 214 where the target temperature TTF is set to the PM removal temperature TPM. Next, the routine proceeds to step 215. At step 215, temperature raising control is performed to raise the temperature TF of the particulate filter 24 to the target temperature TTF and maintain it there. At the following step 216, it is judged if the temperature raising control or PM removal processing should be ended. When the PM removal processing should not be ended, the routine returns to step 215 where the temperature raising control is continued. When the PM removal processing should be ended, the processing cycle is ended.

REFERENCE SIGNS LIST 1 engine body
21 exhaust pipe
24 particulate filter
71i exhaust gas inflow passage
71o exhaust gas outflow passage
72 partition wall
75 coated layer
CZ coated zone
NCZ non-coated zone

The invention claimed is:

1. An exhaust purification device for internal combustion engine which is provided with:
a particulate filter which is arranged inside of an engine exhaust passage for trapping particulate matter (PM) which is contained in exhaust gas, which particulate filter is provided with alternately arranged exhaust gas inflow passages and exhaust gas outflow passages and porous partition walls which separate these exhaust gas inflow passages and exhaust gas outflow passages from each other, wherein in each partition wall, a coated zone where a coated layer with an average pore size which is smaller than an average pore size of a partition wall substrate is used to cover the substrate surface and a non-coated zone at the downstream side of the coated zone and where the substrate surface is not covered by said coated layer, are defined and wherein a pore size of each partition wall is set so that the ash which is contained in the exhaust gas can pass through the partition wall in the non-coated zone;
an electronic control unit (ECU) configured to judge if a particulate matter trapping rate of the particulate filter has fallen below an allowable lower limit value; and
the ECU to initiate PM removal processing which removes particulate matter from the particulate filter when it is judged that the particulate matter trapping rate of the particulate filter has fallen below the allowable lower limit value.

2. The exhaust purification device for internal combustion engine according to claim 1 wherein said ECU detects a pressure loss of the particulate filter and judges that said particulate matter trapping rate has fallen below the allowable lower limit value when said detected pressure loss increases over the allowable upper limit value.

3. The exhaust purification device for internal combustion engine according to claim 1 wherein said ECU finds a change rate of a pressure loss of the particulate filter with respect to the particulate matter trapped quantity on the particulate filter, judges if a local minimum value has occurred in that change rate of the pressure loss, and, when judging that a local minimum value has occurred in that change rate of the pressure loss, judges that the particulate matter trapping rate has fallen below the allowable lower limit value.

4. The exhaust purification device for internal combustion engine according to claim 1 wherein said ECU finds a quantity of particulate matter which flows into the particulate filter, finds a quantity of particulate matter which flows out from the particulate filter, uses these found quantities of particulate matter as the basis to find the particulate matter trapping rate of the particulate filter, and judges if said found particulate matter trapping rate has fallen below the allowable lower limit value.

5. An exhaust purification device for an internal combustion engine which is provided with:
a particulate filter which is arranged inside of an engine exhaust passage and which traps particulate matter (PM) which is contained in exhaust gas, in the particulate filter, a change rate of pressure loss of the particulate filter with respect to a particulate matter trapped quantity on the particulate filter is maintained substantially constant regardless of an increase of the particulate filter trapped quantity or the change rate of pressure loss of the particulate filter increases along with the increase of the particulate matter trapped quantity when the particulate matter trapped quantity is less than a predetermined value and,
when the particulate matter trapped quantity further increases, the change rate of pressure loss of the particulate filter decreases and then increases through a local minimum value along with the increase of the particulate matter trapped quantity;

an electronic control unit (ECU) configured to judge if a particulate matter trapping rate of the particulate filter has fallen below an allowable lower limit value; and the ECU to initiate PM removal which removes particulate matter from the particulate filter when it is judged that the particulate matter trapping rate of the particulate filter has fallen below the allowable lower limit value.

6. The exhaust purification device for internal combustion engine according to claim 5 wherein said ECU detects the pressure loss of the particulate filter and judges that said particulate matter trapping rate has fallen below the allowable lower limit value when said detected pressure loss increases over the allowable upper limit value.

7. The exhaust purification device for internal combustion engine according to claim 5 wherein said ECU finds the change rate of the pressure loss of the particulate filter with respect to the particulate matter trapped quantity on the particulate filter, judges if a local minimum value has occurred in that change rate of the pressure loss, and, when judging that a local minimum value has occurred in that change rate of the pressure loss, judges that the particulate matter trapping rate has fallen below the allowable lower limit value.

8. The exhaust purification device for internal combustion engine according to claim 5 wherein said ECU finds a quantity of particulate matter which flows into the particulate filter, finds a quantity of particulate matter which flows out from the particulate filter, uses these found quantities of particulate matter as the basis to find the particulate matter trapping rate of the particulate filter, and judges if said found particulate matter trapping rate has fallen below the allowable lower limit value.

* * * * *